United States Patent
Gomez Martinez

(10) Patent No.: US 10,230,425 B1
(45) Date of Patent: Mar. 12, 2019

(54) TRANSMISSION POWER LEVEL CONFIGURATION FOR CROSSTALK RELATIONSHIP

(71) Applicant: Marvell International Ltd., Hamilton (BM)

(72) Inventor: Feliciano Gomez Martinez, San Jose, CA (US)

(73) Assignee: Marvell International Ltd., Hamilton (BM)

( * ) Notice: Subject to any disclaimer, the term of this patent is extended or adjusted under 35 U.S.C. 154(b) by 499 days.

(21) Appl. No.: 14/863,042

(22) Filed: Sep. 23, 2015

Related U.S. Application Data

(60) Provisional application No. 62/054,093, filed on Sep. 23, 2014.

(51) Int. Cl.
 *H04B 3/32* (2006.01)
 *H04M 3/34* (2006.01)
 *H04B 3/487* (2015.01)

(52) U.S. Cl.
 CPC ............... *H04B 3/32* (2013.01); *H04B 3/487* (2015.01); *H04M 3/34* (2013.01)

(58) Field of Classification Search
 None
 See application file for complete search history.

(56) References Cited

U.S. PATENT DOCUMENTS

| | | | |
|---|---|---|---|
| 3,534,172 A | 10/1970 | Weeda | |
| 5,887,032 A | 3/1999 | Cioffi | |
| 7,002,897 B2 | 2/2006 | Jones et al. | |
| 7,672,367 B1 | 3/2010 | Kimpe et al. | |
| 8,175,262 B1 | 5/2012 | Leung et al. | |
| 8,848,505 B1 | 9/2014 | Leung et al. | |
| 2006/0215792 A1 | 9/2006 | Murugan et al. | |
| 2007/0002736 A1 | 1/2007 | Gade et al. | |
| 2007/0253469 A1 | 11/2007 | Kite | |

(Continued)

OTHER PUBLICATIONS

ITU-T Recommendation G.9960, "Unified high-speed wireline-based home networking transceivers—System architecture and physical layer specification," *Int'l Telecommunication Union*, pp. 1-160 (Dec. 2011).

(Continued)

*Primary Examiner* — Yaotang Wang

(57) ABSTRACT

A method for configuring transmission power spectral density (PSD) levels for a plurality of communication lines is described. A first set of configurations for the plurality of communication lines is determined based on a set of channel coefficients that indicates a crosstalk relationship and a set of noise coefficients that indicates background noise of each receiver. Each configuration of the first set indicates respective transmission PSD levels for transmitters associated with the plurality of communication lines. The respective transmission PSD levels are selected from a set of transmission PSD levels. A configuration is selected from the first set based on respective estimated transmission rates of the plurality of communication lines. Each transmission PSD level of a communication line indicated by the selected configuration corresponds to a transmission capacity of the communication line. The transmitters associated with the plurality of communication lines are caused to operate using the selected configuration.

26 Claims, 8 Drawing Sheets

(56) References Cited

U.S. PATENT DOCUMENTS

| | | |
|---|---|---|
| 2008/0214118 A1 | 9/2008 | Ilani et al. |
| 2008/0310520 A1 | 12/2008 | Schenk |
| 2011/0261674 A1* | 10/2011 | Maes ................. H04B 3/32 370/201 |
| 2012/0027060 A1* | 2/2012 | Singh ................. H04B 3/32 375/222 |
| 2015/0124943 A1* | 5/2015 | Oksnnan ............ H04M 3/302 379/1.03 |
| 2015/0280892 A1* | 10/2015 | Verbin ............. H04L 5/0007 370/294 |
| 2015/0304488 A1* | 10/2015 | Amde ............ H04M 11/062 379/1.03 |
| 2016/0073448 A1* | 3/2016 | Strobel ............... H04B 3/32 370/281 |

OTHER PUBLICATIONS

ITU-T Recommendation G.9960, Erratum 1 to Recommendation ITU-T G.9960, *Int'l Telecommunication Union*, 1 page (Jul. 2012).

ITU-T Recommendation G.9960, Erratum 2 to Recommendation ITU-T G.9960, *Int'l Telecommunication Union*, 4 pages (Sep. 2012).

ITU-T Recommendation G.9961, "Unified high-speed wire-line based home networking transceivers—Data link layer specification," *Int'l Telecommunication Union*, pp. 1-220 (Jun. 2010).

ITU-T Recommendation G.9961, Corrigendum 1, "Unified high-speed wire-line based home networking transceivers —Data link layer specification," *Int'l Telecommunication Union*, pp. 1-158 (Dec. 2011).

ITU-T Recommendation G.9961, Amendment 1, "Unified high-speed wire-line based home networking transceivers—Data link layer specification," *Int'l Telecommunication Union*, pp. 1-80 (Sep. 2012).

ITU-T Recommendation G.9961, Corrigendum 2, "Unified high-speed wire-line based home networking transceivers —Data link layer specification," *Int'l Telecommunication Union*, pp. 1-122 (Jul. 2013).

ITU-T Recommendation G.9961, Amendment 2, "Unified high-speed wire-line based home networking transceivers—Data link layer specification," *Int'l Telecommunication Union*, pp. 1-44 (Apr. 2014).

Brown, "G.hn: Draft text for G.9960 (2010) corrigendum 1," *International Telecommunication Union*, pp. 1-184 (Feb. 2011).

Brown, "G.hn: Draft text for G.9961 (2010) corrigendum 1," *International Telecommunication Union*, pp. 1-282 (Feb. 2011).

Boyd et al., "Convex Optimization", Cambridge University Press, NY, USA, 2004, Chapters 9, 10, and 11.

\* cited by examiner $$[-p_1^n, -p_2^n, \ldots, \frac{p_n^n}{\gamma_n}, \ldots, -p_N^n] \cdot [C_{1n}, C_{2n}, \ldots, C_{nn}, \ldots, C_{Nn}]^T = \eta_n \quad \leftarrow 802$$

$$\begin{bmatrix} \frac{p_1^1}{\gamma_1} & -p_2^1 & \cdots & -p_N^1 & 0 & 0 & 0 & \cdots & 0 & 0 & 0 & 0 \\ 0 & 0 & 0 & 0 & -p_1^2 & \frac{p_2^2}{\gamma_2} & \cdots & -p_N^2 & \cdots & 0 & 0 & 0 & 0 \\ 0 & 0 & 0 & 0 & 0 & 0 & 0 & 0 & \cdots & -p_1^N & -p_2^N & \cdots & \frac{p_N^N}{\gamma_N} \end{bmatrix} \begin{bmatrix} C_{11} \\ C_{21} \\ \vdots \\ C_{N1} \\ C_{12} \\ C_{22} \\ \vdots \\ C_{N2} \\ \vdots \\ C_{1N} \\ C_{2N} \\ \vdots \\ C_{NN} \end{bmatrix} = \begin{bmatrix} \eta_1 \\ \eta_2 \\ \vdots \\ \eta_N \end{bmatrix} \quad \leftarrow 804$$

$$\begin{bmatrix} \frac{p_1^1}{\gamma_1} & -p_2^1 & \cdots & -p_N^1 & 0 & 0 & 0 & \cdots & 0 & 0 & 0 & 0 \\ 0 & 0 & 0 & 0 & -p_1^2 & \frac{p_2^2}{\gamma_2} & \cdots & -p_N^2 & \cdots & 0 & 0 & 0 & 0 \\ 0 & 0 & 0 & 0 & 0 & 0 & 0 & 0 & \cdots & -p_1^N & -p_2^N & \cdots & \frac{p_N^N}{\gamma_N} \end{bmatrix} \begin{bmatrix} C_{11} \\ C_{21} \\ \vdots \\ C_{N1} \\ C_{12} \\ C_{22} \\ \vdots \\ C_{N2} \\ \vdots \\ C_{1N} \\ C_{2N} \\ \vdots \\ C_{NN} \end{bmatrix} = \begin{bmatrix} \eta_1 \\ \eta_2 \\ \vdots \\ \eta_N \end{bmatrix} \quad \leftarrow 806$$

$$\begin{bmatrix} \frac{p_1^1}{\gamma_1} & -p_2^1 & \cdots & -p_N^1 & 0 & 0 & 0 & \cdots & 0 & 0 & 0 \\ 0 & 0 & 0 & 0 & -p_1^2 & \frac{p_2^2}{\gamma_2} & \cdots & -p_N^2 & \cdots & 0 & 0 & 0 \\ 0 & 0 & 0 & 0 & 0 & 0 & 0 & 0 & \cdots & -p_1^N & -p_2^N & \frac{p_N^N}{\gamma_N} \\ -\frac{p_1^1}{\gamma_1} & -p_2^1 & \cdots & -p_N^1 & 0 & 0 & 0 & \cdots & 0 & 0 & 0 \\ 0 & 0 & 0 & 0 & -p_1^2 & \frac{p_2^2}{\gamma_2} & \cdots & -p_N^2 & \cdots & 0 & 0 & 0 \\ 0 & 0 & 0 & 0 & 0 & 0 & 0 & 0 & \cdots & -p_1^N & -p_2^N & \cdots \\ \vdots & \vdots & \vdots & \vdots & \vdots & \vdots & \vdots & \vdots & \vdots & \vdots & \vdots & \vdots \\ \frac{p_1^N}{\gamma_N} & -p_2^N & \cdots & -p_N^N & 0 & 0 & 0 & \cdots & 0 & 0 & 0 \\ 0 & 0 & 0 & 0 & -p_1^N & \frac{p_2^N}{\gamma_N} & \cdots & -p_N^N & \cdots & 0 & 0 & 0 \\ 0 & 0 & 0 & 0 & 0 & 0 & 0 & \cdots & -p_1^N & -p_2^N & \cdots & \frac{p_N^N}{\gamma_N} \end{bmatrix} \begin{bmatrix} C_{11} \\ C_{21} \\ \vdots \\ C_{N1} \\ C_{12} \\ C_{22} \\ \vdots \\ C_{N2} \\ \vdots \\ C_{1N} \\ C_{2N} \\ \vdots \\ C_{NN} \end{bmatrix} = \begin{bmatrix} \eta_1 \\ \eta_2 \\ \vdots \\ \eta_N \\ \eta_1 \\ \eta_2 \\ \vdots \\ \eta_N \\ \vdots \\ \eta_1 \\ \eta_2 \\ \vdots \\ \eta_N \end{bmatrix} \quad \leftarrow 808$$

$$\begin{matrix} p^1 = & [\;1 & 0.1 & 0.1 & \ldots & 0.1\;] \\ p^2 = & [\;0.1 & 1 & 0.1 & \ldots & 0.1\;] \\ \vdots & & & \vdots & & \\ p^N & [\;0.1 & 0.1 & 0.1 & \ldots & 1\;] \end{matrix} \quad \leftarrow 810$$

FIG. 8

TRANSMISSION POWER LEVEL CONFIGURATION FOR CROSSTALK RELATIONSHIP

CROSS-REFERENCES TO RELATED APPLICATIONS

This disclosure claims the benefit of U.S. Provisional Patent Application No. 62/054,093, entitled "HF-DSM: High-Frequency Dynamic Spectrum Management," and filed on Sep. 23, 2014, the disclosure of which is incorporated herein by reference in its entirety.

FIELD OF THE DISCLOSURE

The present disclosure relates generally to communication networks and, more particularly, to configuration of transmission power spectral density (PSD) levels for communication lines with a crosstalk relationship.

BACKGROUND

Recently, a number of technologies have been introduced to provide high-speed transmission of multimedia data over existing communication lines, such as power wires, coaxial cables, and phone lines. One such technology is the "G.hn" standard developed by the Telecommunication Standardization Sector of the International Telecommunications Union (ITU-T). When multiple communication lines are near each other, for example, in a bundle of copper communication lines installed in a conduit, there is a potential for a crosstalk relationship between at least some of the communication lines. In some scenarios, crosstalk reduces a Signal to Noise Ratio (SNR) in affected communication lines and thereby reduces a maximum data rate which can be achieved in the affected communication lines. Existing solutions reduce the data rate in each line accordingly.

SUMMARY

In an embodiment, a method for configuring transmission power spectral density (PSD) levels for a plurality of communication lines having a crosstalk relationship includes determining, by the communication device, a first set of configurations for the plurality of communication lines based on a set of channel coefficients that indicates the crosstalk relationship and a set of noise coefficients that indicates a background noise of each receiver. Each configuration of the first set of configurations indicates respective transmission PSD levels for transmitters associated with the plurality of communication lines. The respective transmission PSD levels are selected from a set of transmission PSD levels. The method further includes selecting, by the communication device, a configuration from the first set of configurations based on respective estimated transmission rates of the plurality of communication lines. Each transmission PSD level of a communication line indicated by the selected configuration corresponds to a transmission capacity of the communication line. The method also includes causing, by the communication device, the transmitters associated with the plurality of communication lines to operate using the selected configuration.

In another embodiment, a communication device includes a network interface device having one or more integrated circuits. The one or more integrated circuits are configured to determine a first set of configurations for the plurality of communication lines based on a set of channel coefficients that indicates the crosstalk relationship and a set of noise coefficients that indicates a background noise of each receiver. Each configuration of the first set of configurations indicates respective transmission PSD levels for transmitters associated with the plurality of communication lines. The respective transmission PSD levels are selected from a set of transmission PSD levels. The one or more integrated circuits are configured to select a configuration from the first set of configurations based on respective estimated transmission rates of the plurality of communication lines. Each transmission PSD level of a communication line indicated by the selected configuration corresponds to a transmission capacity of the communication line. The one or more integrated circuits are configured to cause the transmitters associated with the plurality of communication lines to operate using the selected configuration.

In yet another embodiment, a method for configuring transmission PSD levels for a plurality of communication lines having a crosstalk relationship includes selecting, by the communication device, a range of transmission PSD levels for the plurality of communication lines. The method also includes selecting, by the communication device, an estimated transmission rate of each communication line of the plurality of communication lines. The method includes determining, by the communication device, a set of channel coefficients that indicates the crosstalk relationship. The method also includes modeling, by the communication device, a transmission rate of each communication line of the plurality of communication lines to be proportional to a bandwidth of the communication line and a logarithm of a signal to noise ratio of the communication line, wherein the signal to noise ratio corresponds to the set of channel coefficients and a potential configuration that indicates respective transmission PSD levels for the plurality of communication lines. The method includes determining, by the communication device, a selected configuration that i) indicates respective transmission PSD levels for the plurality of communication lines that are within the range of transmission PSD levels, and ii) minimizes, for the plurality of communication lines, a maximum value of a difference between the estimated transmission rate and the modeled transmission rate. The method also includes causing, by the communication device, transmitters associated with the plurality of communication lines to operate using the selected configuration.

In another embodiment, a communication device includes a network interface device having one or more integrated circuits. The one or more integrated circuits are configured to select a range of transmission PSD levels for a plurality of communication lines having a crosstalk relationship. The one or more integrated circuits are configured to select an estimated transmission rate of each communication line of the plurality of communication lines. The one or more integrated circuits are configured to determine a set of channel coefficients that indicates the crosstalk relationship. The one or more integrated circuits are configured to model a transmission rate of each communication line of the plurality of communication lines to be proportional to a bandwidth of the communication line and a logarithm of a signal to noise ratio of the communication line. The signal to noise ratio corresponds to the set of channel coefficients and a potential configuration that indicates respective transmission PSD levels for the plurality of communication lines. The one or more integrated circuits are configured to determine a selected configuration that i) indicates respective transmission PSD levels for the plurality of communication lines that are within the range of transmission PSD levels, and ii) minimizes, for the plurality of communication lines, a maximum value of a difference between the estimated transmission rate and the modeled transmission rate. The one or more integrated circuits are configured to cause transmitters associated with the plurality of communication lines to operate using the selected configuration.

BRIEF DESCRIPTION OF THE DRAWINGS

FIG. 8 is a diagram of example equations for implicit measurement of channel coefficients, according to an embodiment.

DETAILED DESCRIPTION

Figure 1:
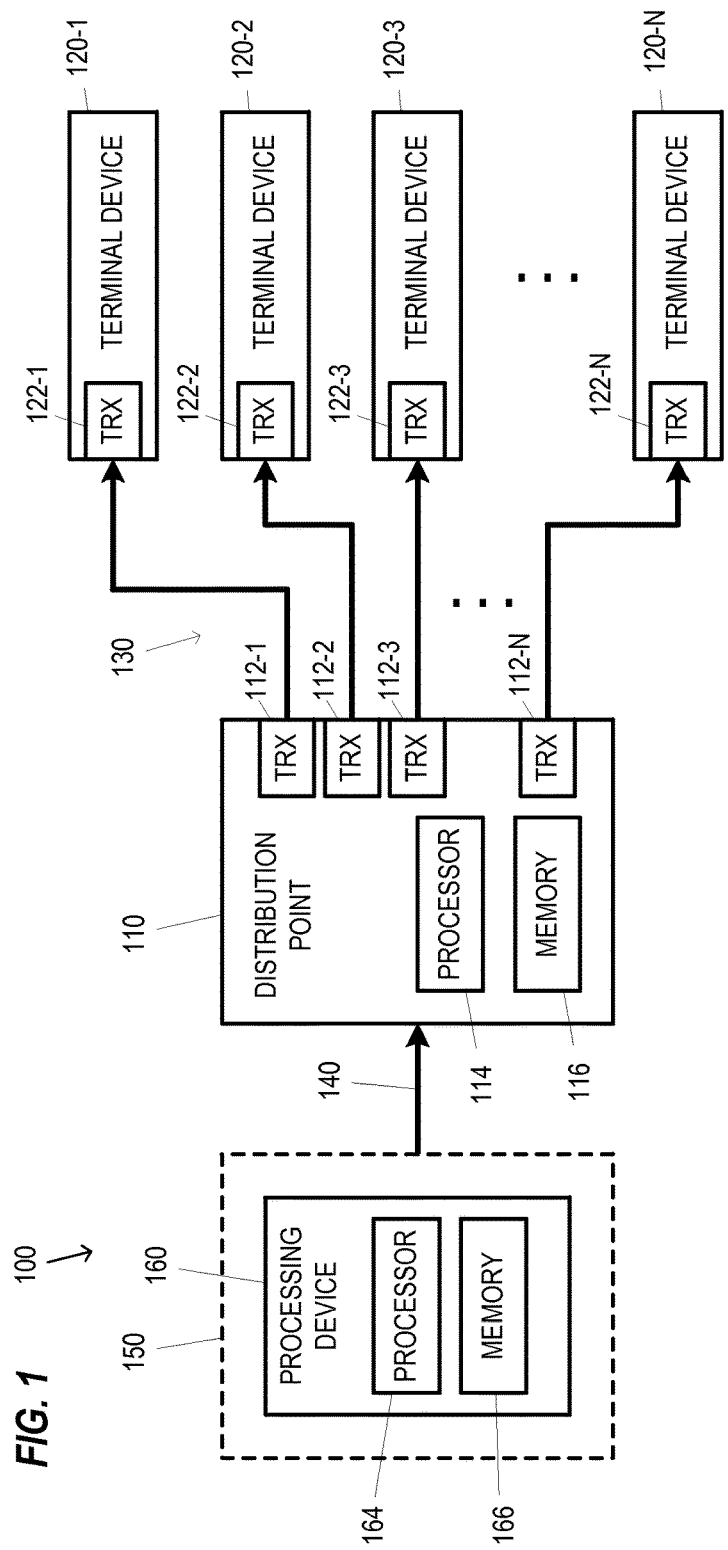
FIG. 1 is a block diagram of an example communication system, according to an embodiment.

When multiple communication lines are near each other (for example, copper communication lines in a bundle installed in a common conduit), there is potential for crosstalk between them. This crosstalk reduces the Signal to Noise Ratio (SNR) in each communication line, and thus a transmission capacity achievable over each communication line is also reduced. As one example, in a G.hn communication system where only one communication line is currently active (i.e., transmitting data), that communication line achieves a data rate of 700 megabits per second (Mbps). However, when multiple communication lines in the same bundle are active in this example, the crosstalk between communication lines reduces the SNR and thus limits the data rate of each communication line to 400 Mbps. As a further example, a communication system having four communication lines might achieve 700 Mbps when only one communication line is active, 500 Mbps when two communication lines are active, 440 Mbps when three communication lines are active, and 400 Mbps when all four communication lines are active. This reduction in per-line performance is acceptable for as long as all lines use the achieved data rate. However, this results in inefficient use of resources if some or all of the lines do not have enough traffic.

In some embodiments and/or scenarios, a more efficient configuration of the communication lines is achieved by adjusting a transmission power spectral density (PSD) level of at least one communication line to a value lower than a maximum transmission PSD level. As one example, in a system with four communication lines having a crosstalk relationship, a first communication line is used for downloading a large file (e.g., several terabytes), while the second, third, and fourth communication lines are used for watching respective video streams that each use 10 Mbps. In this example, the second, third, and fourth communication lines do not fully utilize a configuration that provides 400 Mbps and would likely provide suitable performance with only 100 Mbps, or even 50 Mbps. On the other hand, the first communication line could likely utilize a higher data rate than 400 Mbps. In some embodiments, the PSD in each communication line is a function of frequency, which means that it can have different values in each frequency used by the communication system.

In some embodiments, a discrete selection procedure is performed to select a configuration of transmission PSD levels or other suitable parameters for the communication system. The discrete selection procedures use, in some embodiments, a discrete set of possible configurations on the order of $M^N$, where N is a number of communication lines, and M is a number of discrete PSD levels. A performance metric is computed for each configuration to indicate how "bad" a possible configuration is when trying to meet the requirements of estimated traffic and then a configuration is chosen that minimizes the performance metric (e.g., a "least bad" configuration is selected). In other embodiments, a quasiconvex optimization procedure is performed, in which a quasiconvex optimization problem is generated and solved, with a variable in $R^N$ and order of N quasiconvex constraints. For communication systems in which $M^N$ is relatively small, discrete selection procedures may be more readily performed. For communication systems where $M^N$ becomes large, discrete methods become less desirable due to memory resource limitations and thus quasiconvex optimization methods are more desirable.

FIG. 1 is a block diagram of an example communication system 100, according to an embodiment. A first communication device 110 includes a processor 114 and a memory 116 and is communicatively coupled with a plurality of second terminal devices 120 by a corresponding plurality of communication lines 130. In various embodiments, the communication device 110 is a network distribution point, optical network terminal, broadband access distribution point, or other suitable distribution device for a communication line 140. In various embodiments, each communication device 120 is a terminal device, modem, network device, subscriber device, customer premise equipment, or other suitable device. Each communication device 120 includes a transceiver 122 that is coupled with a corresponding transceiver 112 of the communication device 110 via a communication line 130. In some embodiments, one or more of the transceivers 112 or transceivers 122 is implemented as separate pairs of transmitters and receivers (e.g., an upstream pair and a downstream pair). In various embodiments, the communication lines 130 are power lines, telephone lines, twisted pair lines, or coaxial lines.

For simplicity of explanation, the embodiments described herein refer to the communication device 110 as the distribution point 110 and the communication device 120 as the terminal device 120. In some embodiments, the distribution point 110 and terminal devices 120 communicate according to G.hn standards and protocols, as described in International Telecommunication Union Telecommunication ("ITU-T") Recommendation G.9960 and G.9961. In other embodiments, the distribution point 110 and terminal devices 120 communicate according to another suitable communication protocol. The distribution point 110 provides a gateway or interface to another communication network 150, such as to a local area network, Wi-Fi network, WiMAX network, wide area network, the Internet, or other wired or wireless networks. The distribution point 110 may provide access to a fiber channel network, cable Internet network, or other high speed network. In some embodiments, the communication network 150 is a service provider network, wide area network (WAN), passive optical network (PON), gigabit Ethernet network, or other suitable network and the communication line 140 is an optical line, twisted pair line, coaxial line, or other communication line suitable for the communication network 150.

In an embodiment, the communication network 150 includes a processing device 160, for example, a communication device, a network server, distributed processing platform, cloud service, or other suitable computing platform. The processing device 160 includes a processor 164 and a memory 166 and is communicatively coupled with the distribution point 110. In some embodiments, the processing device 160 has a larger amount of memory and/or processing resources available than the distribution point 110, allowing the distribution point 110 to offload resource intensive tasks, for example, calculation of a performance metric and/or selection of a configuration, as described herein.

In various embodiments and/or scenarios, the distribution point 110 and terminal devices 120 are configured to operate using a configuration, wherein the configuration indicates a plurality of transmission PSD levels. In some embodiments, the plurality of transmission PSD levels correspond to the plurality of transceivers 112 or transmitters of respective transmitter and receiver pairs for downstream communications. In other embodiments, the plurality of transmission PSD levels correspond to transceivers 122 of the terminal devices 120 or transmitters of respective transmitter and receiver pairs for upstream communications. In still other embodiments, the plurality of transmission PSD levels correspond to both the transceivers 112 (for downstream communications) and the transceivers 122 (for upstream communications) between the distribution point 110 and the terminal devices 120. For clarity of explanation, portions of the present discussion generally refer to downstream communication between the transceivers 112 and transceivers 122. In an embodiment, each of the plurality of transceivers 112 has a respective transmission PSD level. In another embodiment, the plurality of transceivers 112 are grouped into two or more transmission groups, each transmitter of a transmission group having a same transmission PSD level, for example, to reduce processing resources used to select a new configuration.

In some embodiments and examples described herein, the plurality of second terminal devices 120 includes N terminal devices 120 and N communication lines 130, where N is an integer. Although four transceivers 112, four communication lines 130, and four terminal devices 120 are illustrated in FIG. 1, the communication system 100 includes other suitable numbers (e.g., 2, 3, 8, 24, 256, etc.) of transceivers 112, communication lines 130, and terminal devices 120 in other embodiments. In some embodiments, some of the transmitters are physically distributed across multiple communication devices 110 (for example, one communication device with 24 lines and another communication device with 24 lines, for a total of 48 lines), but the system is managed as if it were a single communication device from a logical point of view.

In a simplified scenario for explanation, a portion of the communication system 100 provides a two line communication system (i.e., a portion of the N communication lines 130) that uses twenty subcarriers. In this scenario, a channel frequency response in decibels corresponds to:

$$C_{11}=[-20.00\ -20.53\ -21.05\ \ldots\ -29.47\ -30.00]$$

$$C_{22}=[-22.00\ -22.68\ -23.37\ \ldots\ -34.32\ -35.00]$$

$$C_{12}=[-45.00\ -45.11\ -45.21\ \ldots\ -46.89\ -47.00]$$

$$C_{21}=[-45.00\ -45.11\ -45.21\ \ldots\ -46.89\ -47.00] \quad\text{(Equ. 1)}$$

where the receivers 122 have a flat noise floor of −120 dBm/Hz. Each transceiver 112 uses a flat PSD, with a value of −60 dBm/Hz. Each transceiver 112 is configurable to reduce its transmit PSD in steps of predetermined dBs (e.g., 6 dB, up to 18 dB). In other words, each transceiver 112 can be configured to use a flat transmit PSD that can take the values in a set of discrete transmission PSD levels or backoff levels $\{-60, -66, -72, -78\}$ dBm/Hz.

In the simplified scenario, the transceivers 112 are configured to use a signal to noise ratio (SNR)-bitloading table (with a fixed forward error correction rate) according to:

$$\text{bits}=[12\ 10\ 8\ 6\ 4\ 3\ 2\ 1]$$

$$\text{SNR(dB)}=[28.6\ 24.1\ 19.3\ 14.5\ 9.4\ 6.5\ 3.5\ 0.5] \quad\text{(Equ. 2)}$$

where a single communication line 130 can provide a transmission capacity of 800 Mbps when all twenty subcarriers achieve 12 bits per tone and no other communication lines are active. Using the set of discrete transmission PSD levels, a different SNR curve is determined for each communication line with its corresponding bitloading table and data rate.

Figure 2:
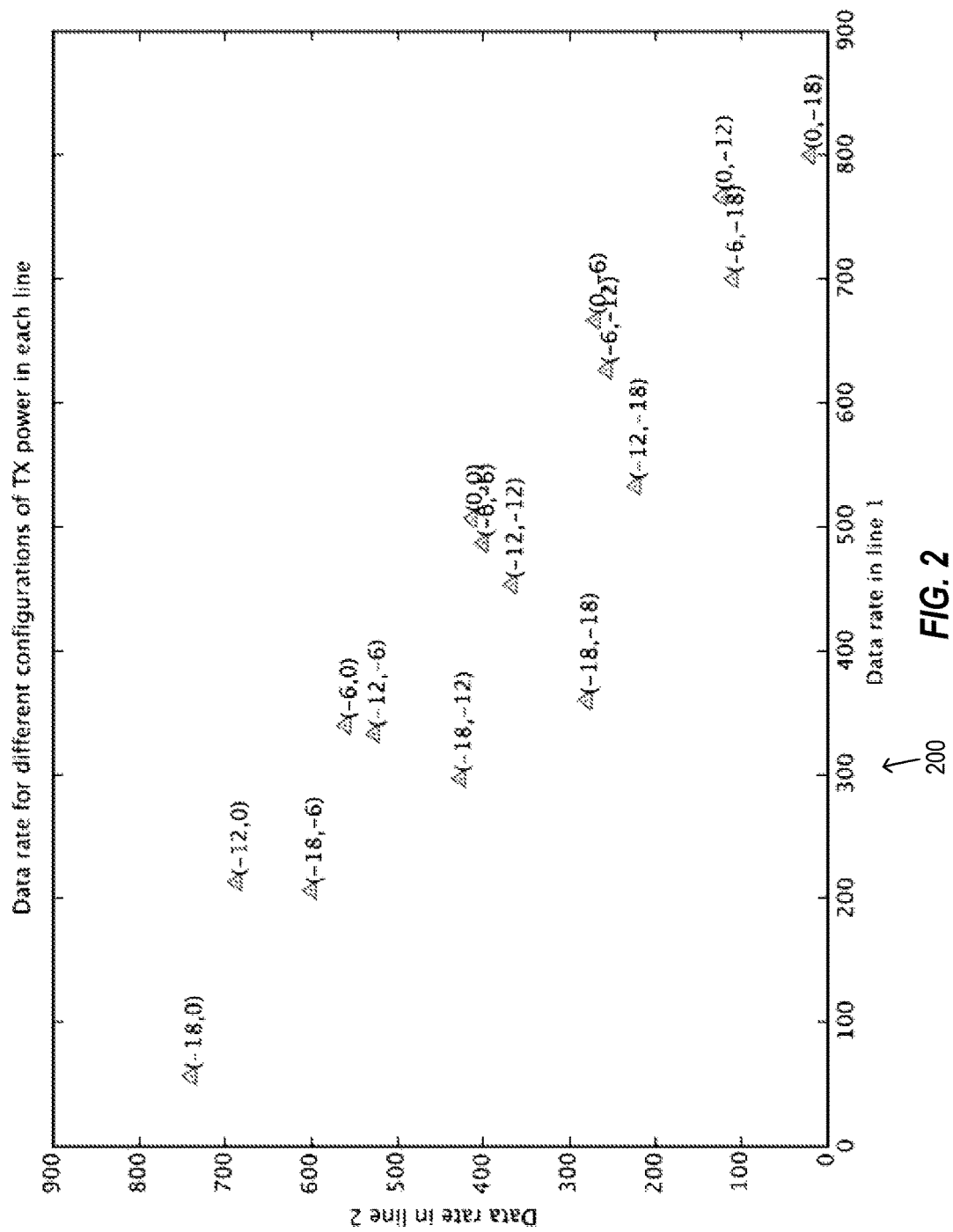
FIG. 2 is a diagram of example configurations for a communication system that uses four discrete power spectral density levels for two terminal devices, according to an embodiment.

FIG. 2 is a diagram of example configurations 200 for the communication system 100 that uses four discrete PSD levels for two terminal devices, according to an embodiment. FIG. 2 illustrates the simplified scenario having two communication lines ("line 1" and "line 2") described above. If both communication lines are operating at full PSD (i.e., 0 dB backoff), then line 1 operates at 506.67 Mbps, while line 2 operates at 413.33 Mbps. If line 1 has 0 dB backoff, while line 2 has 6 dB backoff, then line 1 operates at 666.67 Mbps, while line 2 operates at 270 Mbps. If line 1 has 12 dB backoff, while line 2 has 0 dB backoff, then line 1 operates at 213.33 Mbps, while line 2 operates at 686.67 Mbps. The number of possible configurations corresponds to the number of backoff levels in each communication line raised to the $N^{th}$ power (with N=2 communication lines in this simplified scenario).

Figure 3:
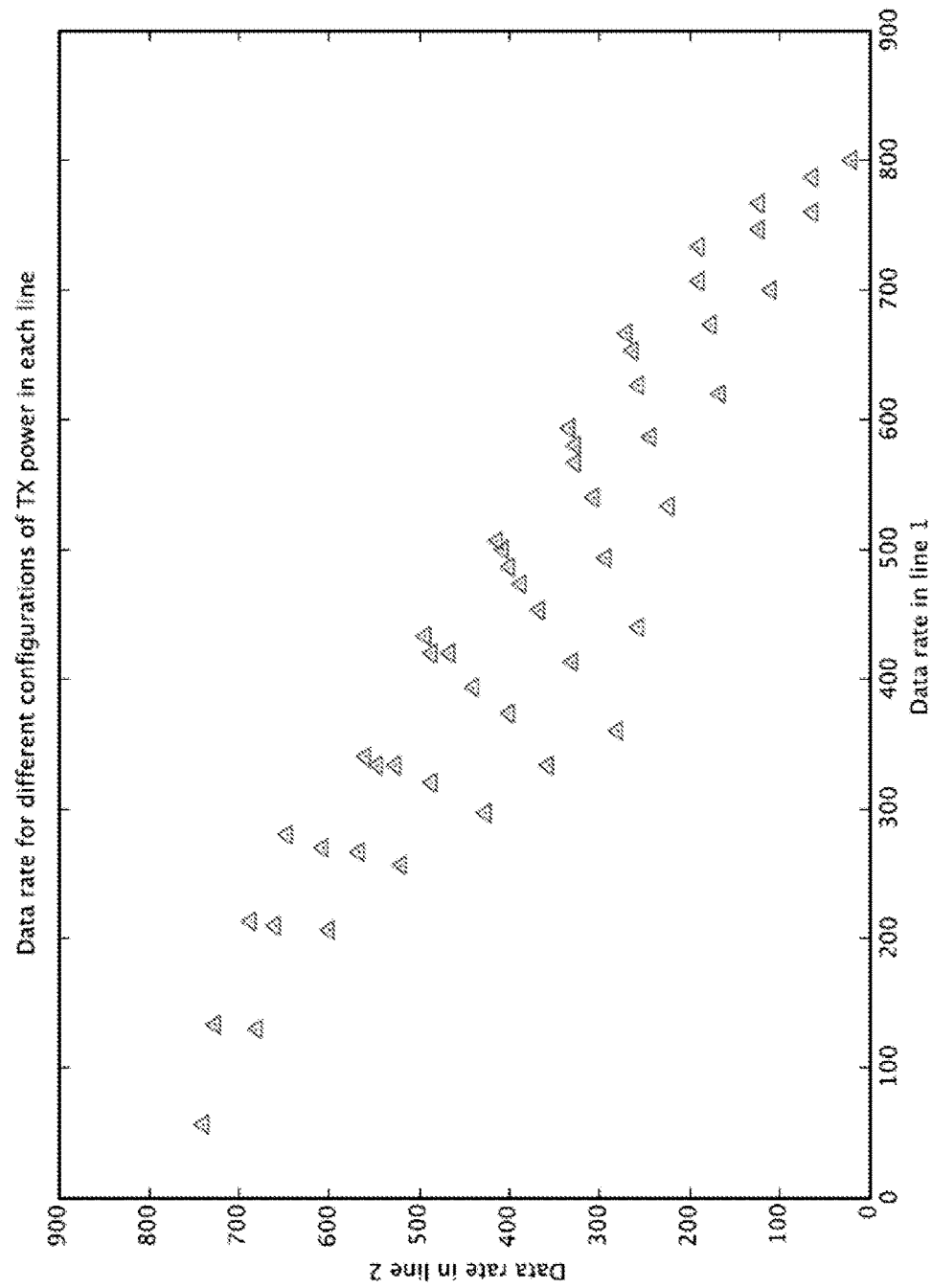
FIG. 3 is a diagram of example configurations for a communication system that uses seven discrete power spectral density levels for two terminal devices, according to an embodiment.

FIG. 3 is a diagram of example configurations 300 for a communication system 100 that uses seven discrete transmission PSD levels for two terminal devices, according to an embodiment. FIG. 3 illustrates a similar simplified scenario, but using a higher granularity of discrete transmission PSD levels: $\{0, -3, -6, \ldots, -18\}$. For a vector of estimated data rates $e=\{e_i\}$ where i is an index of each communication line 130, the distribution point 110 selects an operating point $q^*=\{q_i^*\}$ that optimizes a performance metric $\alpha(q^*, e^*)$, as described below.

In an embodiment, the distribution point 110 controls the plurality of communication lines 130, including the transmission PSD level for each corresponding transceivers 112. In an embodiment, the distribution point 110 is configured to obtain the channel frequency response coefficient between each transceiver 112 and each transceiver 122 and an estimate of noise power (e.g., background noise) in each of the plurality of communication lines 130. In some embodiments, the distribution point 110 obtains the channel frequency response coefficient and the noise power during a training period at a start of operation of the communication system 100 In an embodiment, the distribution point 110 refreshes the channel frequency response coefficient and the noise power measurements (e.g., periodically at a predetermined time interval, upon the occurrence of an event, or other suitable trigger). In an embodiment, the distribution point 110 is configured to measure data traffic sent through each of the plurality of communication lines 130 during a traffic measurement interval. In an embodiment, the distribution point 110 is configured to change between configurations, for example, by updating the transmission PSD levels of each transceiver 112 with low impact on data transmission, for example, minimal changes beyond the change in the bitloading due to changes in the SNR.

In the description below, the following variables are used:

N: A number of active lines in the system.

$\mathcal{N}$: Set of active lines in the system, with $\mathcal{N} = \{1, 2, \ldots, N\}$.

i, n, m: Indices used to refer to individual lines in the system, with i, n, m $\in \mathcal{N}$.

M: A number of configurable PSD transmission levels for each communication line 130.

$\mathcal{P}$: A set of configurable PSD levels, with $= \{P_1, P_2, \ldots, P_M\}$.

$\mathcal{M}$: A set of indices of configurable PSD transmission levels, with $\mathcal{M} = \{1, 2, \ldots, M\}$.

j: An index used to refer to a configurable PSD level, with $j \in \mathcal{M}$.

K: A number of orthogonal frequency division multiplexing (OFDM) tones in each communication line 130.

$\mathcal{K}$: A set of OFDM tones used in each line, with $\mathcal{K} = \{1, 2, \ldots, K\}$ k: An index used to refer to each OFDM tone, with $k \in \mathcal{K}$.

$p_{nk}$: A PSD level used by transmitter $n \in \mathcal{N}$ at tone $k \in \mathcal{K}$ $\mathcal{J}_i$: A set of interferers to communication line i, i.e., all lines of the plurality of communication lines 130 except for communication line i.

$C_{nmk}$: A squared channel response coefficient for transmitter $n \in \mathcal{N}$, receiver $m \in \mathcal{N}$ at tone $k \in \mathcal{K}$.

$\eta_{nk}$: Noise power at receiver $n \in \mathcal{N}$, at tone $k \in \mathcal{K}$.

$\gamma_{nk}$: Signal to noise ratio at receiver $n \in \mathcal{N}$, at tone $k \in \mathcal{K}$, computed as $$\gamma_{nk} = \frac{p_{nk} \cdot C_{nnk}}{\eta_n + \sum_{i \in \mathcal{J}} p_{ik} \cdot C_{ink}} \quad \text{(Equ. 3)}$$

$\mathcal{B}$: A set of permitted modulations in each tone and each communication line, measured in bits/symbol, for example, $\{1, 2, 3, 4, 6, 8, 10, 12\}$.

$\mathcal{F}$: A set of permitted forward error correction rates in each communication line, for example, $\{1/2, 2/3, 5/6, 16/18, 20/21\}$.

$b_{nk}$: A number of bits used by transmitter $n \in \mathcal{N}$, at tone $k \in \mathcal{K}$, with $b_{nk} \in \mathcal{B}$.

$\phi()$: A function $\phi_f: \mathbb{R}^K \to \mathcal{B}^K$ that determines the modulation used in each tone by each transmitter based on the SNR available in each tone $\gamma_{nk}$ when using FEC rate $f \in \mathcal{F}$.

$$\{b_{nk}\} = \phi_f(\{\gamma_{nk}\}) \quad \text{(Equ. 4)}$$

$\Delta w$ is a bandwidth of each of the $\mathcal{K}$ tones.

$\mathcal{B}_f()$: Function $\mathcal{B}_f: \mathcal{B}^K \to \mathbb{R}$ that provides a capacity achieved by a given forward error correction rate $f \in \mathcal{F}$ and a given set of modulation bits $\{b_{ik}\} \in \mathcal{B}^K$, computed as $$\mathcal{B}_f(\{b_{ik}\}) = \Delta w \cdot f \cdot \Sigma_{k \in \mathcal{K}} b_{ik} \quad \text{(Equ. 5)}$$

$h_i$: A forward error correction rate $h_i \in \mathcal{F}$ that maximizes $\mathcal{B}$ for line i:

$$\mathcal{B}_{h_i}(\{b_{ik}\}) \geq \mathcal{B}_f(\{b_{ik}\}), \forall f \in \mathcal{F}. \quad \text{(Equ. 6)}$$

$\phi^*$: A function that maximizes $\mathcal{B}_f$ among all possible $f \in \mathcal{F}$ for a given communication line: $\phi^*, \phi_{h_i}$.

$\hat{w}$: A maximum possible value of $w_i$, given by $$\hat{w} = \Delta_w \cdot K \cdot \sup(\mathcal{B}) \cdot \sup(\mathcal{F}). \quad \text{(Equ. 7)}$$

$w_i$: Transmission capacity achieved in communication line i, given by:

$$w_i = \mathcal{B}_{h_i}(\phi(\{\gamma_{ik}\})) \quad \text{(Equ. 8)}$$

measured in bits per second, where $w_i \in [0, \hat{w}]$.

$o_i$: Observed traffic in communication line i, measured in bits per second.

$s_i$: A Boolean value, with values $s_i \in \{0, 1\}$, that indicates whether the communication line i is saturated. In an embodiment, $s_i$ is calculated as $s_i = 1$ if $o_i \geq w_i$, or if $o_i \geq 0.9 * w_i$. In another embodiment, $s_i = 1$ if a number of buffer overflows in communication line i exceeds a predetermined threshold during a certain time period.

$d_i$: A desired transmission rate in communication line i. In some embodiments, $d_i$ is not known by the distribution point 110 and is estimated, but generally $d_i \in [0, \hat{w}]$.

$e_i$: Estimated data rate desired in communication line i. The estimated data rate $e_i$ is accurate when $d_i < w_i$. When $d_i \geq w_i$, then it is assumed that $d_i \in [w_i, \hat{w}]$. In an embodiment, the estimated data rate is calculated as:

$$e_i = (w_i + \hat{w})/2. \quad \text{(Equ. 9)}$$

$\mathcal{Q}$: The set $\mathcal{Q} = \mathcal{P}^N$ represents the space of all possible system configurations that can be achieved by choosing different PSD levels in each communication line.

q: a potential configuration for the plurality of communication lines, $q \in Q$.

w(q): A set of transmission capacities (e.g., data rates) achieved in configuration q, where $w(q) \in [0, \hat{w}]^N$. Each element of w(q) can be computed as $$w_i(q) = \mathcal{B}_{h_i^q}(\phi^*(\{\gamma_{ik}^q\})) \quad \text{(Equ. 10)}$$

where $\gamma_{ik}^q$ is the SNR achieved with the set of transmission PSD levels used in configuration q, and $h_i^q$ is an optimal forward error correction rate for line i in configuration q:

$$\gamma_{nk}^q = \frac{p_{nk}^q \cdot C_{nnk}}{\eta_{nk} + \sum_{i \in \mathcal{J}} p_{nk}^q \cdot C_{ink}} \quad \text{(Equ. 11)}$$

$$\mathcal{B}_{h_i^q}(\varphi_{h_i^q}(\gamma_{ik}^q)) \geq \mathcal{B}_f(\varphi_f(\gamma_{ik}^q)), \forall f \in \mathcal{F} \quad \text{(Equ. 12)}$$

$\hat{\mathcal{Q}}$: A subset of $\mathcal{Q}$ whose elements are efficient or "Pareto-optimal," determined as:

$$\hat{\mathcal{Q}} = \{q \in \mathcal{Q} : \nexists r \in : w(r) \geq w(q), r \neq q\} \quad \text{(Equ. 13)}$$

where the relationship $w(r) \geq w(q)$ is a component-by-component comparison in $\mathbb{R}^N$:

$$w(r) \geq w(q) \Leftrightarrow w_i(r) \geq w_i(q), \forall i \in \mathcal{N} \text{ and } w(r) \neq w(q). \quad \text{(Equ. 14)}$$

e: An N-dimensional vector of estimated data rates desired by the communication lines given by $e = \{e_1, e_2, \ldots, e_N\} \in [0, \hat{w}]N$.

o: An N-dimensional vector of observed data rates given by $$o=\{o_1,o_2,\ldots,o_N\}\in[0,\widehat{W}\,]^N.$$

z: A current configuration of the communication system 100, with $z\in \mathcal{Q}$.

Figure 4:
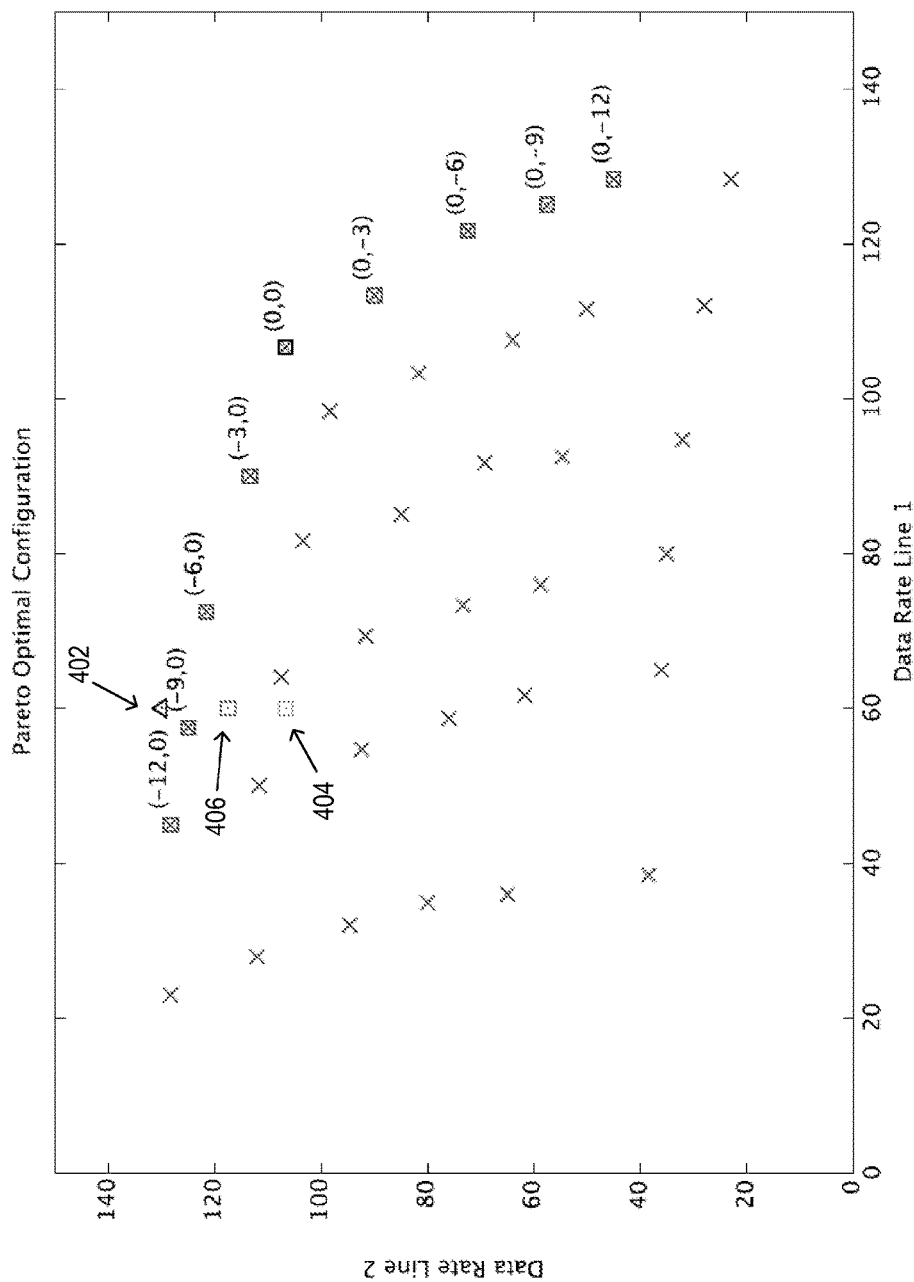
FIG. 4 is a diagram of example configurations for a communication system that uses six discrete power spectral density levels for two terminal devices, according to an embodiment.

FIG. 4 is a diagram of example configurations for a communication system that uses six discrete PSD levels for two terminal devices, according to an embodiment. As shown in FIG. 4, crosses represent values of w(q) for $q\in \mathcal{Q}$. The crosses within squares represent the values of w(q) for $q\in \widehat{\mathcal{Q}}$ (the subset of "Pareto optimal" points). The triangle 402 represents the desired data rate $d_i$, the square 404 represents the observed data rate o, the square 406 represents the estimated data rate e. In an embodiment, a configuration $q\in \widehat{\mathcal{Q}}$ satisfies the estimated data rate e if w(q)≥e, for example, using a component by component comparison:

$$w(q)\geq e \Leftrightarrow w_i(q)\geq e_i, \forall i \in \mathcal{N}. \quad \text{(Equ. 15)}$$

In various embodiments, the performance metric α is used to compare different configurations and determine how well each configuration meets the estimated data rate e. In an embodiment, the performance metric α is selected to be used in comparisons even in cases where some values of w(q) are greater than or equal to e while other values of w(q) are not greater than or equal to e. In an embodiment, the performance metric is a function α(q,e).

The function α(q, e) provides a performance metric for comparison of various configurations, for example, how "bad" a possible configuration q is when trying to meet the requirements of estimated traffic e (i.e., lower values of the performance metric indicate a more desirable configuration). In an embodiment, the α(q, e) is selected to satisfy three goals. First, if a configuration $q_1$ satisfies data rate e, but configuration $q_2$ does not satisfy data rate e, then α($q_1$, e) is less than α($q_2$, e). Second, if two configurations $q_1$ and $q_2$ both satisfy data rate e, then the configuration that allows for more "room for data rate growth" has a lower value of performance metric α. For this goal, room for data growth is determined as $\min_{i\in \mathcal{N}}\{|w_i(q)-e_i|\}$. Third, if two configurations $q_1$ and $q_2$ don't satisfy data rate e, then the configuration that has a smaller "gap" with the data rate e has a lower value of performance metric α. For this goal, the gap is determined as $$\max_{j\in \varepsilon}\{|e_j-w_j(q)|\} \text{ with } j\in \varepsilon=\{i\in \mathcal{N}: e_i>w_i(q)\} \quad \text{(Equ. 16)}$$

such that gaps are only measured for dimensions in which the data rate e exceeds the data rates w(q). In an embodiment, performance metric α is defined as α(q,e)=$\max_{i\in \mathcal{N}}\{e_i-w_i(q)\}$.

In various embodiments and/or scenarios, a selection procedure is used to select the configuration for the communication system 100. For example, the distribution point 110 or the processing device 160 performs the selection procedure to select the configuration for the communication system. In various embodiments and/or scenarios, the selection procedure is a capacity maximizing procedure, power optimization procedure, quasiconvex optimization procedure, or other suitable procedures. In at least some embodiments, the distribution point 110 performs the selection procedure selected from a set of available selection procedures. In some embodiments, the processing device 160 performs the selection procedure selected from the set of available selection procedures. In some embodiments, the distribution point 110 and the processing device 160 each perform a portion of the selection procedure. For simplicity of explanation, the embodiments described herein refer to the distribution point 110 as selecting and performing the selection procedure.

In an embodiment, the distribution point 110 dynamically selects the selection procedure based on system conditions, for example, network conditions, traffic flow rates, a total number of terminal devices, a number of active terminal devices, processing resources of the system, or other suitable conditions. For example, in an embodiment, the distribution point 110 selects i) a capacity maximizing procedure for a first time interval having high levels of requested traffic, ii) a power optimization procedure for a second time interval having high costs for electricity or other operational costs, and iii) a quasiconvex optimization procedure for a third time interval having high levels of available processing power.

In some embodiments, the distribution point 110 performs the selection procedure to select the configuration periodically using an update interval. In an embodiment, the update interval is one second, three seconds, 30 seconds, or another suitable time interval. In some embodiments, the distribution point 110 selects the configuration based on the occurrence of a subscriber trigger, traffic threshold trigger, or other suitable trigger. In an embodiment, a subscriber trigger occurs when a terminal device 120 joins the communication system 100 (e.g., the terminal device 120 is turned on, newly configured, initialized, granted access, etc.) or leaves the communication system 100 (e.g., the subscriber line 120 is turned off, disconnected, or denied further access). In an embodiment, a traffic threshold trigger occurs when a transmission data rate for the distribution point 110 or the terminal devices 120 meets a predetermined threshold (e.g., 40% of a maximum data rate, 60% of the maximum data rate, etc.) or changes by a predetermined amount (e.g., 5% increase in transmission data rate, 10% decrease in transmission data rate).

In various embodiments, the distribution point 110 is configured to perform a capacity maximizing procedure as the selection procedure to dynamically select a configuration for the communication system 100. In an embodiment, the distribution point 110 is configured to select a configuration based on current system conditions upon the occurrence of a trigger or update interval. In one such embodiment, the distribution point 110 changes to the selected configuration without consideration for the previous configuration. For example, the distribution point 110 does not attempt to keep a previous configuration even if the previous configuration, though sub-optimal, still satisfies traffic needs. In this embodiment, the selection procedure is an "aggressive" selection procedure that readily updates the current configuration as system conditions change. In some embodiments, the aggressive selection procedure is selected when transition costs to change from the previous configuration to the current configuration are relatively small or below a predetermined threshold. In another embodiment, the distribution point 110 changes to the selected configuration only if the previous configuration does not satisfy the current traffic needs. In this embodiment, the selection procedure is a "lazy" selection procedure that only changes the current configuration when the current traffic needs are not met by the previous configuration.

In some embodiments and/or scenarios, when the communication system 100 changes from a configuration $q^a$ to a configuration $q^b$, the transmission PSD level used in each communication line 130 changes, which also changes the SNR each of the communication lines 130. For example, the SNR of each communication line changes either because the transmission PSD level of the communication line itself has changed, or because the transmission PSD level in an adjacent communication line has changed. In scenarios where the SNR decreases, the current bitloading in a communication line likely to be less suitable for transmission (e.g., having a high number of transmission errors). If a previous bitloading is used with a reduced PSD transmission level, an increase in packet reception errors will likely increase, causing a new channel estimation process so that a new bitloading will be selected. While the new channel estimation process is completed the communication line may be briefly disrupted (e.g., several milliseconds or even seconds). This disruption causes a reduction in data throughput for the communication system 100 and can be considered a "transition cost." In an embodiment, the distribution point 110 indicates to the transceiver 122 in advance that PSD levels are going to change, then immediately sends a communication line probe, as described herein, so that the channel estimation can be performed more quickly and with less disruption.

Figure 5:
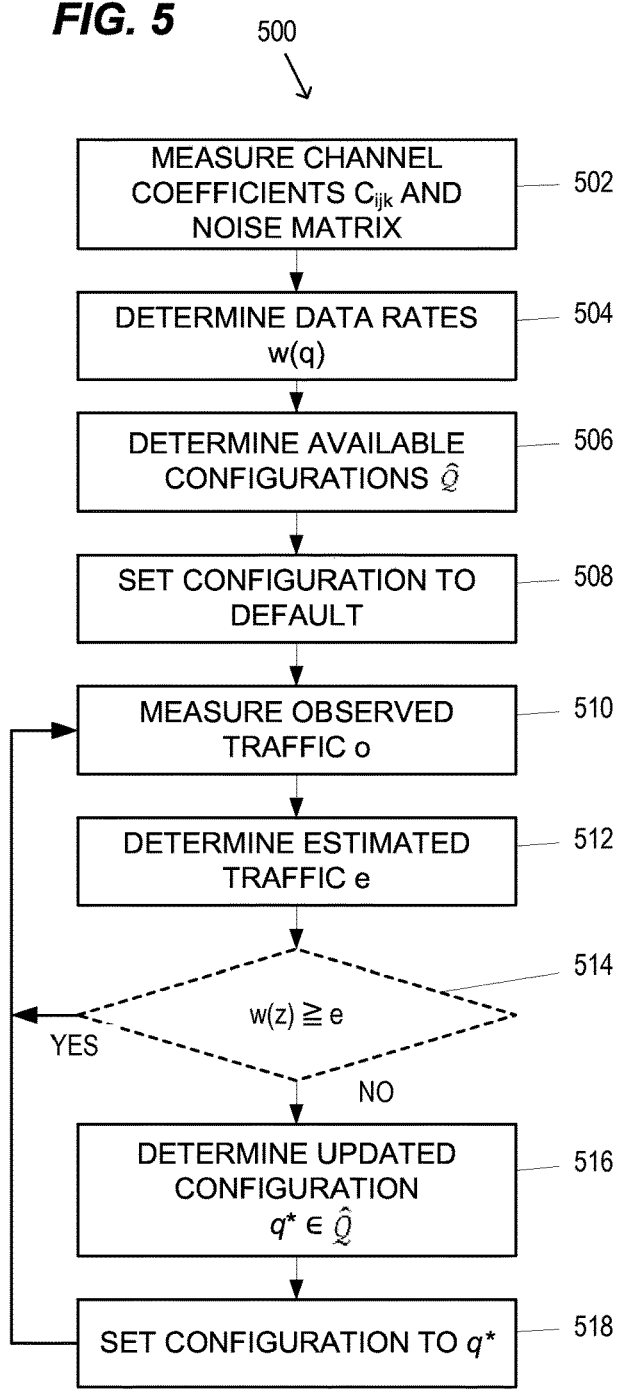
FIG. 5 is a flow diagram of an example method for selecting a configuration for a communication system using a capacity maximizing procedure, according to an embodiment.

FIG. 5 is a flow diagram of an example method 500 for selecting a configuration for a communication system using a capacity maximizing procedure, according to an embodiment. With reference to FIG. 1, the method 500 is implemented by the distribution point 110, in an embodiment. For example, in one such embodiment, the processor 114 is configured to implement the method 500. With continued reference to FIG. 1, in yet another embodiment, the method 500 is implemented by the processing device 160 (e.g., the processor 164). In another embodiment, the distribution point 110 and the processing device 160 are each configured to implement at least a part of the method 500. In other embodiments, the method 500 is implemented by other suitable communication devices.

At block 502, channel coefficients $C_{ijk}$ and a noise matrix $\eta_{ijk}$ corresponding to the plurality of communication lines 130 are determined. In an embodiment, the distribution point 110 determines the channel coefficients $C_{ijk}$ and the noise matrix $\eta_{ijk}$ based on information received from the terminal devices 120. In another embodiment, a modem or other processor associated with the corresponding transceiver 122 of a terminal device 120 determines at least a portion of the channel coefficients $C_{ijk}$ and the noise matrix $\eta_{ik}$.

At block 504, data rates w(q) for each possible configuration $q \in Q$ are determined. For example, in an embodiment, the distribution point 110 determines a data rate for each terminal device 120 based on the transmission PSD levels of the possible configurations, the corresponding signal to noise ratios, and the bitloading tables.

At block 506, the available configurations $\hat{Q}$ are selected as a subset of Pareto-optimal configurations from the possible configurations Q.

At block 508, a current configuration z of the communication system 100 is set to a default or initial configuration. For example, in an embodiment, the distribution point 110 sets the transceiver 112 for each communication line 130 to a maximum PSD transmission level.

At block 510, observed traffic o is measured for each terminal device 120. For example, in an embodiment, the distribution point 110 estimates a bandwidth usage for each terminal device 130 based on a respective data transmission counter associated with the terminal device 130.

At block 512, estimated transmission rates e are determined for each terminal device 120 based on the observed traffic o.

At block 514, it is determined whether the current configuration z satisfies the estimated transmission rates e. For example, in an embodiment, the distribution point 110 determines whether each data rate in w(z) is greater than or equal to the corresponding estimated transmission rates e, as described above for the "lazy" selection procedure. In some embodiments, block 514 is skipped or bypassed for the "aggressive" selection procedure and block 516 is performed after block 512.

If it is determined at block 514 that the current configuration satisfies the estimated transmission rates e, then the flow proceeds to block 510. In some embodiments, the distribution point 110 waits for a next update interval or trigger before returning to block 510. On the other hand, if it is determined at block 514 that the current configuration does not satisfy the estimated transmission rates e, then the flow proceeds to block 516.

At block 516, an updated configuration $q^* \in \hat{Q}$ is determined. For example, in an embodiment, the distribution point 110 determines the performance metric $\alpha(q, e)$ for each possible configuration $q \in \hat{Q}$ and selects the $q^*$ that minimizes $\alpha(q, e)$.

At block 518, the current configuration z is set to the selected configuration $q^*$. For example, in an embodiment, the distribution point 110 configures each transceiver 112 with the corresponding transmission PSD level of the selected configuration $q^*$. The flow then returns to block 510. In some embodiments, the distribution point 110 waits for a next update interval or trigger before returning to block 510.

Figure 6:
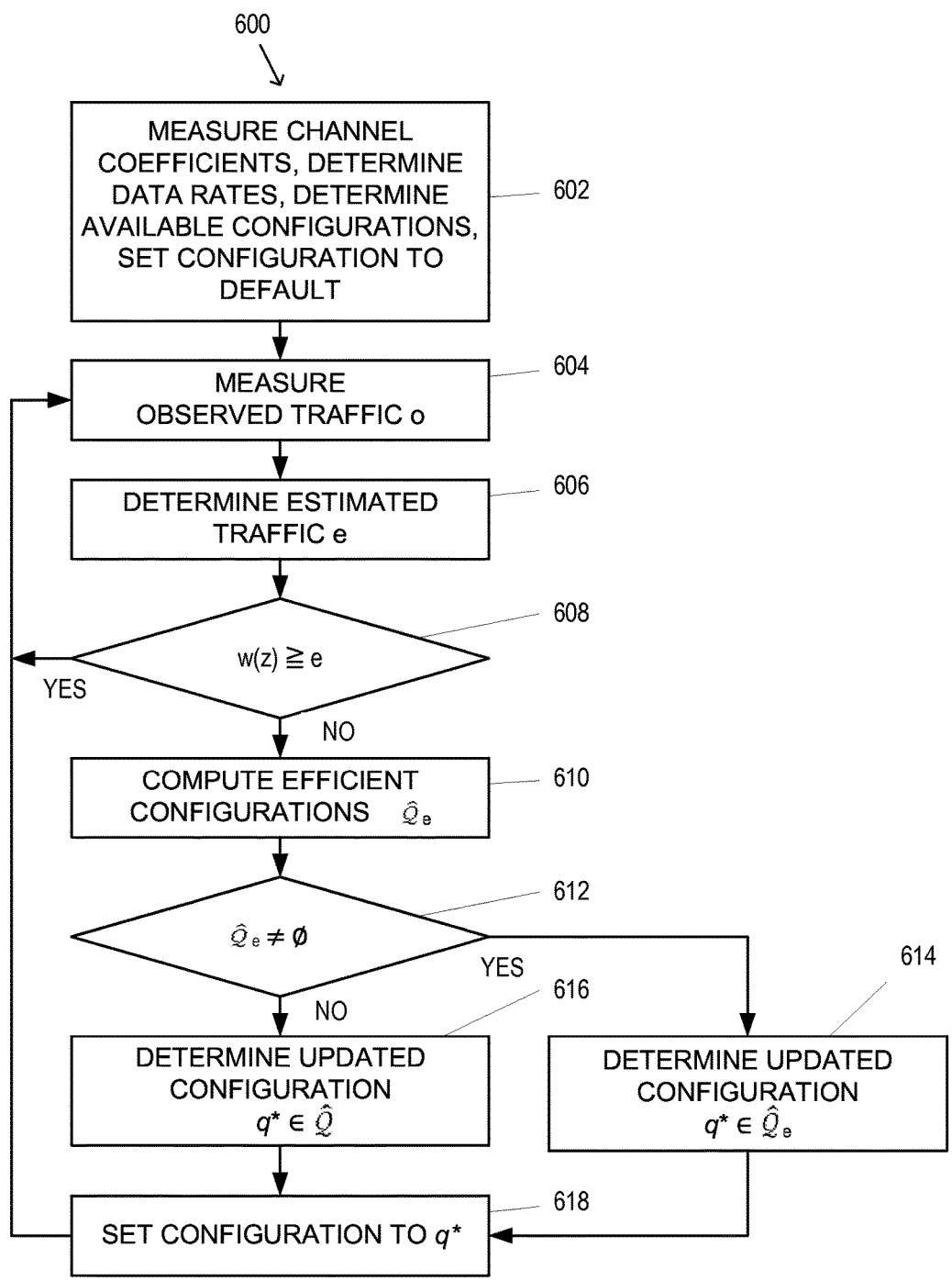
FIG. 6 is a flow diagram of another example method for selecting a configuration for a communication system using a capacity maximizing procedure, according to an embodiment.

FIG. 6 is a flow diagram of an example method 600 for selecting a configuration for a communication system using a capacity maximizing procedure, according to an embodiment. With reference to FIG. 1, the method 600 is implemented by the distribution point 110, in an embodiment. For example, in one such embodiment, the processor 114 is configured to implement the method 600. With continued reference to FIG. 1, in yet another embodiment, the method 600 is implemented by the processing device 160 (e.g., the processor 164). In another embodiment, the distribution point 110 and the processing device 160 are each configured to implement at least a part of the method 600. In other embodiments, the method 600 is implemented by other suitable communication devices.

In some embodiments and/or scenarios, the estimated transmission rates e are determined based on the observed traffic o and the current data rates in w(z). In an embodiment, the estimated transmission rate is accurate for each "unsaturated" communication line i of the estimated transmission rates $e_i$ that is less than the corresponding data rate $w_i(z)$, but less accurate for "saturated" communication lines where $e_i$ is greater than or equal to $w_i(z)$. In some scenarios, the estimated value of e for a saturated line is too high and accordingly, a new configuration selected based on that information results in a configuration in which previously unsaturated lines are now saturated. In some scenarios, the method 600 reduces the likelihood of saturating previously unsaturated communication lines by initially selecting from only those configurations which keep the currently unsaturated lines unsaturated while improving the current configuration.

At block 602, channel coefficients $C_{ijk}$ and a noise matrix $\eta_{ijk}$ corresponding to the plurality of communication lines 130 are determined, data rates w(q) for each possible configuration $q \in Q$ are determined, available configurations $\hat{Q}$ are selected as a subset of Pareto-optimal configurations from the possible configurations Q, and a current configuration z of the communication system 100 is set to a default or initial configuration. In an embodiment, block 602 corresponds to blocks 502, 504, 506, and 508 as described above with respect to FIG. 5.

At block 604, observed traffic o is measured for each terminal device 120. For example, in an embodiment, the distribution point 110 estimates a bandwidth usage for each terminal device 130 based on a respective data transmission counter associated with the terminal device 130.

At block 606, estimated transmission rates e are determined for each terminal device 120 based on the observed traffic o.

At block 608, it is determined whether the current configuration z satisfies the estimated transmission rates e. For example, in an embodiment, the distribution point 110 determines whether each data rate in w(z) is greater than or equal to the corresponding estimated transmission rates e. If it is determined at block 608 that the current configuration satisfies the estimated transmission rates e, then the flow proceeds to block 604. In some embodiments, the distribution point 110 waits for a next update interval or trigger before returning to block 604. On the other hand, if it is determined at block 608 that the current configuration does not satisfy the estimated transmission rates e, then the flow proceeds to block 610.

At block 610, efficient configurations $\hat{Q}_e$ are determined, which includes only those configurations where currently unsaturated communication lines 130 of the communication system 100 remain unsaturated. In an embodiment, the distribution point 110 determines the efficient configurations $\hat{Q}_e$ as the set of configurations for which the currently unsaturated communication links remain unsaturated and which are different from the current configuration. For example, the distribution point 110 determines the set of indices H according to:

$$H = \{i \in : w_i(z) \geq e_i\} \quad \text{(Equ. 17)}$$

and determines the efficient configurations $\hat{Q}_e$ according to $$\hat{Q}_e = \{q \in \hat{Q} : w_i(q) \geq e_i, i \in H, q \neq z\}. \quad \text{(Equ. 18)}$$

At block 612, it is determined whether the set of efficient configurations $\hat{Q}_e$ is empty. If it is determined that the set of efficient configurations $\hat{Q}_e$ is not empty, then the flow proceeds to block 614. On the other hand, if it is determined that the set of efficient configurations $\hat{Q}_e$ is empty, then the flow proceeds to block 616.

At block 614, an updated configuration $q^* \in \hat{Q}_e$ is determined from the set of efficient configurations $\hat{Q}_e$. For example, in an embodiment, the distribution point 110 determines the performance metric $\alpha(q, e)$ for each possible configuration $q \in \hat{Q}_e$ and selects the configuration $q^*$ within $\hat{Q}_e$ that minimizes $\alpha(q, e)$.

At block 616, an updated configuration $q^* \in \hat{Q}_e$ is determined from the set of possible configurations $\hat{Q}$. For example, in an embodiment, the distribution point 110 determines the performance metric $\alpha(q, e)$ for each possible configuration $q \in \hat{Q}$ and selects the $q^*$ that minimizes $\alpha(q, e)$. In this scenario, the distribution point 110 expands a search space to include all possible configurations if there are no available configurations that keep the currently unsaturated communication lines unsaturated.

At block 618, the current configuration z is set to the selected configuration q* obtained at block 614 or block 616. For example, in an embodiment, the distribution point 110 configures each transceiver 112 with the corresponding transmission PSD level of the selected configuration q*. The flow then returns to block 604. In some embodiments, the distribution point 110 waits for a next update interval or trigger before returning to block 604.

In some embodiments, the distribution point 110 selects a configuration that takes into account a total transmission power level for the plurality of communication lines. For example, in an embodiment, the distribution point 110 selects a configuration from the set of possible configurations Q instead of from the Pareto-optimal configurations $\hat{Q}$ or the efficient configurations $\hat{Q}_e$. In an embodiment, the performance metric $\alpha(q,e)$ includes the transmission PSD for the communication lines 130. In an embodiment, the performance metric $\alpha$ is determined as:

$$\alpha^P(q,e) = \delta_1 \alpha(q,e) + \delta_2(\Sigma_{i \in} \mathcal{N} \Sigma_{k \in} \mathcal{K} p_{ik}^q) \quad \text{(Equ. 19)}$$

where $p_{ik}^q$ is the transmission PSD level used by communication line i in tone k when the system configuration is q and where $\delta_1$ and $\delta_2$ are positive value weights that indicate the relative importance of power efficiency as compared to system capacity. In an embodiment, the distribution point 110 selects a configuration that minimizes the total transmission power for the plurality of communication lines.

In various embodiments and/or scenarios, distribution point 110 is configured to estimate the channel frequency response (CFR) between a transceiver 112 and corresponding transceiver 122. For example, in an embodiment, the distribution point 110 is configured according to the International Telecommunication Union Telecommunication Standardization Sector (ITU-T) G.9960 Recommendation (also known as the G.hn specification), the G.9700 Recommendation (also known as the G.fast specification) or other suitable network standards. In this embodiment, the distribution point 110 manages the exchange of communication line probes, such as G.hn probes, between the transmitters 112 and receivers 122. For example, in an embodiment, the distribution point 110 broadcasts a probe schedule to each transmitter and receiver pair for the communication lines 130. The probe schedule indicates transmission times or other suitable information for scheduling the G.hn probes. The distribution point 110 sets the probe schedule such that the G.hn probes are periodically transmitted over each communication line 130 and that when each G.hn probe is transmitted, no other transceiver 112 is transmitting over the plurality of communication lines 130. In some embodiments, the probe schedule also indicates an orthogonal preamble to be used for the corresponding G.hn probe. In an embodiment, the distribution point 110 estimates the CFR for each of the plurality of communication lines 130 during a channel estimation period or a system maintenance period. In an embodiment, the distribution point 110 estimates the CFR for at least some of the plurality of communication lines 130 at different times and periodically updates the channel coefficients $C_{nmk}$ as updated CFR values are estimated.

In some embodiments, the distribution point 110 precomputes the data rates w(q) for each configuration of the set of Pareto-optimal configurations $\hat{Q}$, followed by selecting a configuration q which minimizes $\alpha(q, e)$. In some embodiments and/or scenarios, the processing and/or memory resources used for this precomputation increases according to $M^N$, where M is the number of transmission PSD levels and N is the number of communication lines. In an embodiment, the distribution point 110 uses a quasiconvex optimization procedure instead of the capacity maximizing procedure described above to reduce at least some of the memory resources used to select the configuration.

Figure 7:
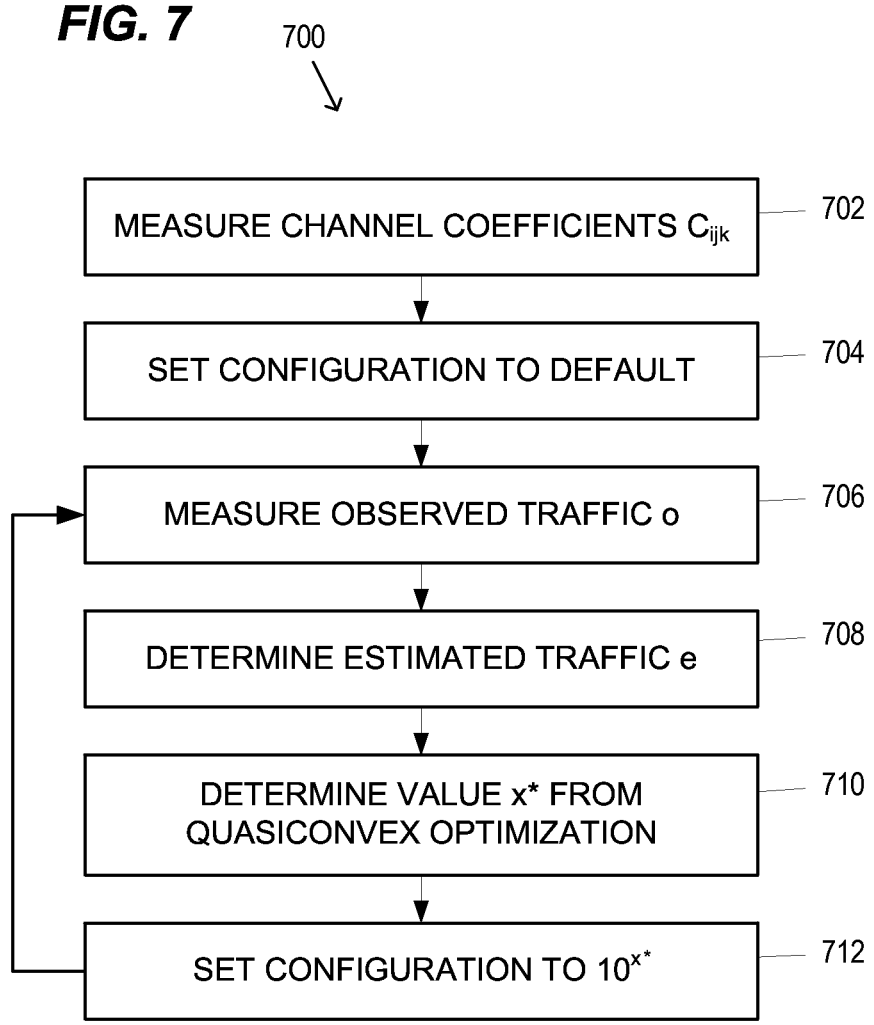
FIG. 7 is a flow diagram of an example method for selecting a configuration for a communication system using a quasiconvex optimization procedure, according to an embodiment.

FIG. 7 is a flow diagram of an example method 700 for selecting a configuration for a communication system using a quasiconvex optimization procedure, according to an embodiment. With reference to FIG. 1, the method 700 is implemented by the distribution point 110, in an embodiment. For example, in one such embodiment, the processor 114 is configured to implement the method 700. With continued reference to FIG. 1, in yet another embodiment, the method 700 is implemented by the processing device 160 (e.g., the processor 164). In another embodiment, the distribution point 110 and the processing device 160 are each configured to implement at least a part of the method 700. In other embodiments, the method 700 is implemented by other suitable communication devices.

For the quasiconvex optimization procedure, $\mathcal{Q}$ is defined as:

$$\mathcal{Q} = [P_1, P_M]^N \quad \text{(Equ. 20)}$$

such that for any configuration $q \in \mathcal{Q}$, the individual transmission PSD levels $q_i$ can take any value within a selected range between $P_1$ and $P_M$. In some embodiments using the quasiconvex optimization procedure, the transmission PSD levels $q_i$ are not limited to discrete PSD levels and can include any continuous value between $P_1$ and $P_M$. To determine the transmission capacities $w_n(q)$, Shannon's channel capacity theorem is used instead of an exact bitloading formula to increase the likelihood of quasiconcavity of the function $w(q)$:

$$w_n(q) = \sum_{k \in \mathcal{K}} \Delta_w \cdot \log_2(1 + \gamma_{nk}) \quad \text{(Equ. 21)}$$

$$w_n(q) = \sum_{k \in \mathcal{K}} \Delta_w \cdot \log_2\left(1 + \frac{C_{nnk} \cdot p_{nk} \cdot q_n}{\eta_{nk} + \sum_{i \in \mathcal{J}} C_{ink} \cdot p_{ik} \cdot q_i}\right) \quad \text{(Equ. 22)}$$

In some embodiments, Equation 22 models the transmission capacity of each communication line to be proportional to a bandwidth of the communication line and a logarithm of a signal to noise ratio of the communication line. In at least some scenarios for typical values of crosstalk and noise, the function $w(q)$ is quasiconcave. A variable change of $q=10^x$ is performed to model a potential configuration q as an antilogarithm and a function $w_n^*(x) = w_n(10^x)$ maintains quasiconcavity by modeling the transmission capacity as a quasiconcave function. With this variable change, the performance metric $\alpha(10^x, e)$ is defined as:

$$\alpha(10^x, e) = \max_{n \in \mathcal{N}} \{e_n - w_n^*(x)\} \quad \text{(Equ. 23)}$$

which is quasiconvex.

A quasiconvex optimization problem to be solved with the quasiconvex optimization procedure is given by:

$$(P_e) \begin{cases} \text{minimize: } \alpha(q, e) = \max_{n \in N} \{e_n - w_n(q)\} \\ \text{subject to: } \\ P_1 \leq q_n \leq P_M \\ q = 10^x \end{cases} \quad \text{(Equ. 24)}$$

where the optimization variable is $x \in \mathbb{R}^N$ and the vector of estimated data rates e is given.

Problem ($P_e$) can be reformulated as follows:

$$(P_e') \begin{cases} \text{minimize: } s \\ \text{subject to: } \\ e_n - w_n(q) \leq s, \forall n \in N \\ P_1 \leq q_n \leq P_M \\ q = 10^x \end{cases} \quad \text{(Equ. 25)}$$

where the optimization variables are $s \in \mathbb{R}$ and $x \in \mathbb{R}^N$ and the vector of estimated data rates e is given.

The distribution point 110 is configured to solve the optimization problem $P_e'$ or the optimization problem $P_e$ using a convex optimization algorithm, such as an unconstrained minimization algorithm, an equality constrained minimization algorithm, an interior-point method, or other suitable algorithm. Examples of convex optimization algorithms are described in S. Boyd, L. Vandenberghe, "Convex Optimization", Cambridge University Press, NY, USA, 2004, Chapters 9, 10, and 11, which is incorporated herein by reference in its entirety.

At block 702, channel coefficients $C_{ijk}$ and a noise matrix $\eta_{ijk}$ corresponding to the plurality of communication lines 130 are determined. In an embodiment, the distribution point 110 determines the channel coefficients $C_{ijk}$ and the noise matrix $\eta_{ijk}$ based on information received from the terminal devices 120. In another embodiment, a modem or other processor associated with the corresponding transceiver 122 of a terminal device 120 determines at least a portion of the channel coefficients $C_{ijk}$ and the noise matrix $\eta_{ik}$.

At block 704, a current configuration z of the communication system 100 is set to a default or initial configuration. For example, in an embodiment, the distribution point 110 sets the transceiver 112 for each communication line 130 to a maximum PSD transmission level.

At block 706, observed traffic z is measured for each terminal device 120. For example, in an embodiment, the distribution point 110 estimates a bandwidth usage for each terminal device 130 based on a respective data transmission counter associated with the terminal device 130.

At block 708, estimated transmission rates e are determined for each terminal device 120 based on the observed traffic o.

At block 710, the quasiconvex optimization problem $P_e'$ is solved using a convex optimization algorithm to obtain a solution $x^*$ and then solution $q^*=10^{x^*}$.

At block 712, the current configuration z of the communication system 100 is set to the configuration according to the solution $q^*$. The flow then returns to block 706. In some embodiments, the distribution point 110 waits for a next update interval or trigger before returning to block 706.

In some embodiments, the distribution point 110 explicitly determines channel coefficients for the plurality of communication lines 130. In an embodiment, for r=1, 2, . . . , N: i) the distribution point 110 configures a transceiver 112 for communication line r to transmit a probe signal at a certain predetermined PSD level and configures all other communication lines n ≠ r to remain silent; ii) each transceiver 122 for n=1, 2, . . . , N uses the probe signal from the r-th transceiver 112 to measure $C_{rnk}$. In an embodiment, the distribution point 110 transmits a probe schedule to each transceiver 112 and transceiver 122 for the plurality of communication lines 130 to allow for synchronization of the transmissions and measurements.

In some embodiments, the distribution point 110 implicitly determines channel coefficients for the plurality of communication lines 130. In an embodiment, the distribution point 110 changes PSD transmission levels for each of the plurality of communication lines 130 in a controlled manner and measures how the SNR in each communication line is affected to determine the channel coefficients. For simplicity of explanation, the following examples use only a single tone so that the sub-index that represents tones may be omitted.

FIG. 8 is a diagram of example equations for implicit measurement of channel coefficients, according to an embodiment. In an embodiment, the noise level at each transceiver 122 is given by $\eta_n$ and a first vector of transmission PSD levels $p^a$ (i.e., a configuration for the transceivers 112) is selected such that $p^a = [p_1^a, p_2^a, \ldots, p_N^a]$. The distribution point 110 causes the communication system 100 to operate using the vector of transmission PSD levels $p^a$ and measures the resultant SNR $\gamma_n^g$ in each communication line according to:

$$\gamma_n^a = \frac{C_{nn} \cdot p_n^a}{\eta_n + \sum_{i \in \mathcal{J}} C_{in} \cdot p_i^a} \quad \text{(Equ. 26)}$$

This equation can be reordered to obtain a linear relationship:

$$\frac{p_n^a}{\gamma_n^a} C_{nn} - \sum_{i \in \mathcal{J}} C_{in} \cdot p_i^a = \eta_i \quad \text{(Equ. 27)}$$

Referring to FIG. 8, the Equation 27 is reformulated into a vector equation 802. In matrix form, for all $n \in \mathcal{N}$, the vector equation 802 becomes matrix equation 804. Matrix equation 804 has N equations and $N^2$ unknown values and thus cannot be solved. In an embodiment, the distribution point 110 selects a second vector of transmission PSD levels $p^b$ such that $p^b = [p_1^b, p_2^b, \ldots p_N^b]$, which provides a second set of SNR and a second set of N equations, shown in matrix equation 806. By repeating this measurement process N times, a set of $N^2$ linear equations is obtained. Using a super-index g in $p^g$ to indicate the g-th measurement, the system of equations is now given by matrix equation 808.

The matrix equation 808 can be represented as $H \cdot \hat{c} = \hat{\eta}$ where $$H \in \mathbb{R}^{N^2 \times N^2}, \hat{c} \in \mathbb{R}^{N^2}, \text{ and } \hat{\eta} \in \mathbb{R}^{N^2} \quad \text{(Equ. 28)}$$

In an embodiment, a process of determining the channel coefficients $C_{ij}$ is now given by: i) measuring the vector $\eta$ and building the vector $\hat{\eta}$; ii) for g=1, 2, ..., N, performing the steps of a) choosing a vector of PSDs $p^g$ (e.g., a test configuration) and configuring the communication system 100 to use the chosen vector, b) waiting for the communication system 100 to measure the resultant vector of SNR $\gamma^g$ for the test configuration, and c) using $p^g$ and $\gamma^g$ to compute rows $(g-1)N+1$ to $((g-1)N+N)$ in matrix H; iii) computing $\hat{c} = H^{-1} \hat{\eta}$; and iv) using the vector $\hat{c}$ to reconstruct the matrix $C_{ij}$.

The distribution point 110 selects the PSD vectors $p^1$, $p^2$, ..., $p^N$ such that the rows of matrix H are linearly independent. In some scenarios, a random selection of the PSD vectors results in a high condition number for the matrix H. In an embodiment, the distribution point 110 selects the vectors $p^g$ in such a way that one communication line has a first transmission PSD level that is relatively high (e.g., at or near maximum PSD) while each of the other communication lines have a second transmission PSD that is relatively low (e.g., 5% of maximum PSD, 10% of maximum PSD, or another suitable value). The vectors 810 show one example of the vectors $p^g$, according to an embodiment.

Based on the description above, the process for determining the channel coefficients for a single tone can be extended to a system with K tones. For each iteration g=1, 2, ... N, the SNR is measured in each communication line and each tone ($\gamma_{ik}$), the matrix H is computed for each tone ($H_k$), the inverse of the matrix H is computed to obtain the vector $\hat{c}$ for each tone ($\hat{C}_k$), which is then used to build the matrix $C_{ijk}$. In some embodiments and/or scenarios, measurements of SNR $\gamma_{ik}$ are likely to be noisy. In an embodiment, additional constraints are placed on $C_{ijk}$, such as forcing smooth variations between consecutive values of k (smooth channel frequency response) or forcing that $C_{ijk} = C_{jik}$ (symmetrical interference).

In some embodiments, the distribution point 110 and the processing device 160 each perform a portion of the selection procedure. With reference to FIG. 5, in an embodiment, the distribution point 110 performs the steps corresponding to blocks 502, 508, 510, 512, and 518 while the processing device 160 performs the steps corresponding to blocks 504, 506, 514, and 516. With reference to FIG. 7, in an embodiment, the distribution point 110 performs the steps corresponding to blocks 702, 704, 706, 708, and 712 while the processing device 160 performs the steps corresponding to block 710.

At least some of the various blocks, operations, and techniques described above may be implemented utilizing hardware, a processor executing firmware instructions, a processor executing software instructions, or any combination thereof. When implemented utilizing a processor executing software or firmware instructions, the software or firmware instructions may be stored in any computer readable memory such as on a magnetic disk, an optical disk, or other storage medium, in a RAM or ROM or flash memory, processor, hard disk drive, optical disk drive, tape drive, etc. Likewise, the software or firmware instructions may be delivered to a user or a system via any known or desired delivery method including, for example, on a computer readable disk or other transportable computer storage mechanism or via communication media. Communication media typically embodies computer readable instructions, data structures, program modules or other data in a modulated data signal such as a carrier wave or other transport mechanism. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, radio frequency, infrared and other wireless media. Thus, the software or firmware instructions may be delivered to a user or a system via a communication channel such as a telephone line, a DSL line, a cable television line, a fiber optics line, a wireless communication channel, the Internet, etc. (which are viewed as being the same as or interchangeable with providing such software via a transportable storage medium). The software or firmware instructions may include machine readable instructions that, when executed by the processor, cause the processor to perform various acts.

When implemented in hardware, the hardware may comprise one or more of discrete components, an integrated circuit, an application-specific integrated circuit (ASIC), etc.

While the present invention has been described with reference to specific examples, which are intended to be illustrative only and not to be limiting of the invention, changes, additions and/or deletions may be made to the disclosed embodiments without departing from the scope of the invention.

What is claimed is:

1. A method implemented in a communication device for configuring transmission power spectral density (PSD) levels for a plurality of communication lines having a crosstalk relationship, the method comprising:
   determining a first set of configurations for the plurality of communication lines using i) a set of discrete transmission PSD levels, ii) a set of channel coefficients that indicates the crosstalk relationship and iii) a set of noise coefficients that indicates a background noise of each receiver, each configuration of the first set of configurations indicating respective transmission PSD levels for transmitters associated with the plurality of communication lines, wherein the respective transmission PSD levels are selected from the set of discrete transmission PSD levels, the set of discrete transmission PSD levels having two or more different active transmission PSD levels that support non-zero transmission capacities;
   selecting a configuration from the first set of configurations based on respective estimated transmission rates of the plurality of communication lines, each transmission PSD level of a communication line indicated by the selected configuration corresponding to a transmission capacity of the communication line; and
   causing the transmitters associated with the plurality of communication lines to operate using the selected configuration.

2. The method of claim 1, wherein selecting the configuration comprises selecting the configuration from the first set of configurations based on respective performance metrics for each of the first set of configurations, wherein each performance metric is based on: i) each of the respective estimated transmission rates of the plurality of communication lines, and ii) each of the respective transmission capacities of the plurality of communication lines.

3. The method of claim 2, wherein selecting the configuration comprises selecting the configuration from the first set of configurations that minimizes the performance metric, wherein the performance metric is based on: i) a first weighted metric for a comparison of each of the respective estimated transmission rates of the plurality of communication lines with each of the respective transmission capacities of the plurality of communication lines, and ii) a second weighted metric for a total transmission PSD level for the plurality of communication lines.

4. The method of claim 1, wherein determining the first set of configurations for the plurality of communication lines comprises determining respective transmission capacities of the plurality of communication lines for each configuration of the first set of configurations.

5. The method of claim 1, further comprising periodically updating the estimated transmission rates of the plurality of communication lines.

6. The method of claim 5, wherein periodically updating the estimated transmission rates comprises estimating a bandwidth usage for the communication line based on a data transmission counter associated with the communication line.

7. The method of claim 5, wherein selecting the configuration comprises periodically selecting the configuration from the first set of configurations based on updated estimated transmission rates.

8. The method of claim 5, wherein periodically updating the estimated transmission rates comprises receiving the estimated transmission rates from a network distribution device that includes the transmitters associated with the plurality of communication lines; and wherein
   the method further comprising sending an indication of the selected configuration to the network distribution device.

9. The method of claim 1, further comprising periodically updating the set of channel coefficients based on one or more communication line probes on the communication line, wherein each of the one or more communication line probes is transmitted between a transmitter and receiver pair for the communication line.

10. The method of claim 9, wherein:
    periodically updating the set of channel coefficients comprises causing a probe schedule to be transmitted to each transmitter and receiver pair for the plurality of communication lines; and
    the probe schedule indicates transmission times for at least the one or more communication line probes.

11. The method of claim 9, wherein periodically updating the set of channel coefficients comprises receiving the set of channel coefficients from a network distribution device that includes the transmitters associated with the plurality of communication lines; and wherein
    the method further comprising sending an indication of the selected configuration to the network distribution device.

12. The method of claim 9, wherein periodically updating the set of channel coefficients comprises:
    configuring the transmitters to use each configuration of a plurality of test configurations, wherein each configuration of the plurality of test configurations corresponds to a respective communication line of the plurality of communication lines;
    measuring a respective SNR value in each of the plurality of communication lines for each configuration of the plurality of test configurations; and
    determining the set of channel coefficients based on a matrix of coefficients that: i) corresponds to the measured SNR values, and ii) has linearly independent rows that correspond to the plurality of test configurations.

13. The method of claim 1, wherein the set of discrete transmission PSD levels further includes a third transmission PSD level that corresponds to communication lines that are turned off, disconnected, or denied further access.

14. A communication device, comprising:
    a network interface device having one or more integrated circuits configured to:
        determine a first set of configurations for the plurality of communication lines using i) a set of discrete transmission PSD levels, ii) a set of channel coefficients that indicates the crosstalk relationship, and iii) a set of noise coefficients that indicates a background noise of each receiver, each configuration of the first set of configurations indicating respective transmission PSD levels for transmitters associated with the plurality of communication lines, wherein the respective transmission PSD levels are selected from the set of discrete transmission PSD levels, the set of discrete transmission PSD levels having two or more different active transmission PSD levels that support non-zero transmission capacities,
        select a configuration from the first set of configurations based on respective estimated transmission rates of the plurality of communication lines, each transmission PSD level of a communication line indicated by the selected configuration corresponding to a transmission capacity of the communication line, and cause the transmitters associated with the plurality of communication lines to operate using the selected configuration.

15. The communication device of claim 14, wherein the one or more integrated circuits are configured to select the configuration from the first set of configurations based on respective performance metrics for each of the first set of configurations, wherein each performance metric is based on: i) each of the respective estimated transmission rates of the plurality of communication lines, and ii) each of the respective transmission capacities of the plurality of communication lines.

16. The communication device of claim 15, wherein the one or more integrated circuits are configured to select the configuration from the first set of configurations that minimizes the performance metric, wherein the performance metric is based on: i) a first weighted metric for a comparison of each of the respective estimated transmission rates of the plurality of communication lines with each of the respective transmission capacities of the plurality of communication lines, and ii) a second weighted metric for a total transmission PSD level for the plurality of communication lines.

17. The communication device of claim 14, wherein the one or more integrated circuits are configured to determine respective transmission capacities of the plurality of communication lines for each configuration of the first set of configurations.

18. The communication device of claim 14, wherein the one or more integrated circuits are configured to periodically update the estimated transmission rates of the plurality of communication lines.

19. The communication device of claim 18, wherein the one or more integrated circuits are configured to estimate a bandwidth usage for the communication line based on a data transmission counter associated with the communication line.

20. The communication device of claim 18, wherein the one or more integrated circuits are configured to periodically select the configuration from the first set of configurations based on updated estimated transmission rates.

21. The communication device of claim 18, wherein the one or more integrated circuits are configured to:

receive the estimated transmission rates from a network distribution device that includes the transmitters associated with the plurality of communication lines; and send an indication of the selected configuration to the network distribution device.

22. The communication device of claim 14, wherein:

the one or more integrated circuits are configured to periodically update the set of channel coefficients based on one or more communication line probes on the communication line; and each of the one or more communication line probes is transmitted between a transmitter and receiver pair for the communication line.

23. The communication device of claim 22, wherein:

the one or more integrated circuits are configured to cause a probe schedule to be transmitted to each transmitter and receiver pair for the plurality of communication lines; and the probe schedule indicates transmission times for at least the one or more communication line probes.

24. The communication device of claim 22, wherein the one or more integrated circuits are configured to:

receive the set of channel coefficients from a network distribution device that includes the transmitters associated with the plurality of communication lines; and send an indication of the selected configuration to the network distribution device.

25. The communication device of claim 22, wherein the one or more integrated circuits are configured to:

configure the transmitters to use each configuration of a plurality of test configurations, wherein each configuration of the plurality of test configurations corresponds to a respective communication line of the plurality of communication lines;

measure a respective SNR value in each of the plurality of communication lines for each configuration of the plurality of test configurations; and determine the set of channel coefficients based on a matrix of coefficients that: i) corresponds to the measured SNR values, and ii) has linearly independent rows that correspond to the plurality of test configurations.

26. The communication device of claim 14, wherein the set of discrete transmission PSD levels further includes a third transmission PSD level that corresponds to communication lines that are turned off, disconnected, or denied further access.

* * * * *